(12) United States Patent
Ishigami et al.

(10) Patent No.: US 10,384,312 B2
(45) Date of Patent: Aug. 20, 2019

(54) BRAZING SHEET HAVING IMPROVED CORROSION RESISTANCE AFTER BRAZING

(71) Applicant: Mitsubishi Aluminum Co., Ltd., Minato-ku (JP)

(72) Inventors: Sho Ishigami, Sunto-gun (JP); Shohei Iwao, Sunto-gun (JP)

(73) Assignee: Mitsubishi Aluminum Co., Ltd., Minato-ku (JP)

( * ) Notice: Subject to any disclaimer, the term of this patent is extended or adjusted under 35 U.S.C. 154(b) by 0 days.

(21) Appl. No.: 15/554,885

(22) PCT Filed: Mar. 12, 2015

(86) PCT No.: PCT/JP2015/057306
§ 371 (c)(1),
(2) Date: Aug. 31, 2017

(87) PCT Pub. No.: WO2016/143119
PCT Pub. Date: Sep. 15, 2016

(65) Prior Publication Data
US 2018/0043476 A1 Feb. 15, 2018

(51) Int. Cl.
*B23K 31/02* (2006.01)
*B23K 35/02* (2006.01)
(Continued)

(52) U.S. Cl.
CPC ........ *B23K 35/0238* (2013.01); *B23K 1/0012* (2013.01); *B23K 35/0233* (2013.01);
(Continued)

(58) Field of Classification Search
CPC .. B23K 35/0238; B23K 35/286; B23K 35/28; B23K 1/0014; B23K 1/0012;
(Continued)

(56) References Cited

U.S. PATENT DOCUMENTS 3,852,873 A * 12/1974 Chartet ................ B23K 1/0012
228/207
5,375,760 A * 12/1994 Doko ........................ C22F 1/04
148/528
(Continued)

FOREIGN PATENT DOCUMENTS

CN 102251154 A 11/2011
CN 102431237 A 5/2012
(Continued)

OTHER PUBLICATIONS

Translation of JP-2013-133515A (no date available).*
(Continued)

*Primary Examiner* — Kiley S Stoner
(74) *Attorney, Agent, or Firm* — Oblon, McClelland, Maier & Neustadt, L.L.P.

(57) ABSTRACT

The present invention relates to an aluminum alloy brazing sheet with a thickness of 0.30 nm or less, including: a core material; a sacrificial material cladding one surface of the core material; and a brazing material cladding the other surface of the core material, in which the core material is made of Al—Mn—Si-based aluminum alloy containing by mass %, Cu: 0.5 to 1.3%, the sacrificial material is made of aluminum alloy containing, by mass %, Zn: 4.0 to 7.0%, the brazing material is made of aluminum alloy containing, by mass %, Si: 6.0 to 11.0% and Zn: 0.1 to 3.0%, in a pitting potential after brazing beat treatment, a thickness of a region in which a potential difference from the noblest potential in the core material is 100 mV or more is 10% to 50% of the thickness of the brazing sheet.

13 Claims, 4 Drawing Sheets

(51) Int. Cl.
  *B23K 1/00* (2006.01)
  *B23K 35/28* (2006.01)
  *C22C 21/00* (2006.01)
  *C22C 21/02* (2006.01)
  *C22C 21/10* (2006.01)
  *B32B 15/01* (2006.01)
  *C22C 21/14* (2006.01)
  *B23K 101/14* (2006.01)

(52) U.S. Cl.
  CPC ............ *B23K 35/28* (2013.01); *B23K 35/286* (2013.01); *B32B 15/016* (2013.01); *C22C 21/00* (2013.01); *C22C 21/02* (2013.01); *C22C 21/10* (2013.01); *C22C 21/14* (2013.01); *B23K 2101/14* (2018.08); *B32B 2605/00* (2013.01)

(58) Field of Classification Search
  CPC .. B23K 35/0233–0244; B23K 2101/02; B23K 2101/14; C22C 21/14; C22C 21/10; C22C 21/02; C22C 21/00; B32B 15/016; B32B 2605/00
  USPC ............ 228/181, 183, 245–262, 56.3, 228/262.5–262.51, 233.2
  See application file for complete search history.

(56) References Cited

U.S. PATENT DOCUMENTS

| | | | | |
|---|---|---|---|---|
| 7,387,844 B2* | 6/2008 | Ueda | ................. | B23K 35/0238 428/654 |
| 8,227,091 B2* | 7/2012 | Ueda | ................. | B23K 35/0238 228/262.5 |
| 8,247,083 B2* | 8/2012 | Izumi | ................. | B23K 35/0233 428/654 |
| 8,283,049 B2* | 10/2012 | Saisho | ................. | B32B 15/016 228/262.51 |
| 9,012,033 B2* | 4/2015 | Matsuo | ................. | B32B 15/016 165/905 |
| 9,643,283 B2* | 5/2017 | Itoh | ................. | B23K 35/0238 |
| 2002/0034653 A1* | 3/2002 | Okamoto | ........... | B23K 35/0238 428/654 |
| 2002/0037426 A1* | 3/2002 | Yamada | ............... | B23K 1/0012 428/654 |
| 2002/0102431 A1* | 8/2002 | Wittebrood | ............ | B23K 1/008 428/658 |
| 2004/0038071 A1* | 2/2004 | Yoshidomi | ............. | C22C 21/10 428/654 |
| 2005/0064226 A1* | 3/2005 | Benedictus | ........ | B23K 35/0238 428/654 |
| 2005/0079376 A1* | 4/2005 | Benedictus | .......... | B23K 1/0012 428/654 |
| 2007/0166565 A1* | 7/2007 | Fukumoto | .............. | B23K 35/28 428/654 |
| 2009/0162686 A1* | 6/2009 | Matsukado | ........ | B23K 35/0233 428/576 |
| 2009/0165901 A1* | 7/2009 | Koshigoe | .............. | B32B 15/016 148/535 |
| 2010/0112370 A1* | 5/2010 | Ueda | ................. | B23K 35/0238 428/576 |
| 2010/0183897 A1* | 7/2010 | Kobayashi | ......... | B23K 35/0238 428/654 |
| 2010/0263768 A1* | 10/2010 | Hisatomi | .............. | B23K 1/0012 148/535 |
| 2010/0266871 A1* | 10/2010 | Matsuo | ................. | B32B 15/016 428/654 |
| 2011/0027610 A1 | 2/2011 | Tatsumi et al. | | |
| 2011/0287276 A1* | 11/2011 | Izumi | ................. | B23K 35/0233 428/548 |
| 2011/0287277 A1* | 11/2011 | Kimura | .................. | B23K 35/28 428/555 |
| 2012/0129003 A1* | 5/2012 | Ando | ................... | B23K 1/0012 428/654 |
| 2012/0231293 A1* | 9/2012 | Kobayashi | ......... | B23K 35/0238 428/654 |
| 2013/0244051 A1* | 9/2013 | Matsumoto | ........ | B23K 35/0238 428/576 |
| 2013/0244055 A1* | 9/2013 | Kimura | ................ | B23K 35/288 428/654 |
| 2013/0260175 A1* | 10/2013 | Kimura | ................ | B23K 1/0004 428/654 |
| 2014/0134458 A1* | 5/2014 | Fukumoto | .......... | B23K 35/0238 428/654 |
| 2014/0158335 A1* | 6/2014 | Kuroda | ................ | B23K 1/0012 165/185 |
| 2015/0037607 A1* | 2/2015 | Itoh | ..................... | B23K 35/0238 428/654 |
| 2015/0047745 A1* | 2/2015 | Kobayashi | ........... | B23K 35/286 148/26 |
| 2015/0118517 A1* | 4/2015 | Itoh | ......................... | C22C 21/00 428/654 |
| 2015/0144229 A1* | 5/2015 | Ando | ................... | B23K 1/0012 148/523 |
| 2015/0321293 A9* | 11/2015 | Itoh | ......................... | C22C 21/00 428/654 |
| 2017/0321304 A1* | 11/2017 | Shoji | ...................... | B23K 35/28 |
| 2017/0321974 A1* | 11/2017 | Otsuki | ................... | B23K 35/28 |

FOREIGN PATENT DOCUMENTS

| | | | |
|---|---|---|---|
| JP | 09-295089 A | | 11/1997 |
| JP | 2000084661 A | * | 3/2000 |
| JP | 2009-191351 A | | 8/2009 |
| JP | 2010-095758 A | | 4/2010 |
| JP | 2011-026681 A | | 2/2011 |
| JP | 2012-017503 A | | 1/2012 |
| JP | 2012-067401 A | | 5/2012 |
| JP | 2012-117107 A | | 6/2012 |
| JP | 2013-133515 A | | 7/2013 |
| JP | 5339560 B1 * | 11/2013 | ......... B23K 35/0238 |

OTHER PUBLICATIONS

Translation of JP-2010-095758A (no date available).*
Translation of JP-2012-017503A (no date available).*
International Search Report dated Jun. 2, 2015 in PCT/JP2015/057306, filed on Mar. 12, 2015.
Combined Office Action and Search Report dated Jun. 19, 2018 in Chinese Patent Application No. 201580077601.5 (with English language translation), 12 pages.

* cited by examiner

BRAZING SHEET HAVING IMPROVED CORROSION RESISTANCE AFTER BRAZING

TECHNICAL FIELD

The present invention relates to a brazing sheet which is used for a heat exchanger or the like and has an improved corrosion resistance after brazing.

BACKGROUND ART

In the related art, a heat exchanger for automobile made of aluminum alloy is known. This heat exchanger is composed of some parts such as an outer fin, a tube, a header plate, and a side support. Further, in general, the heat exchanger for automobile is manufactured by bonding the parts to each other through a brazing treatment using a fluoride-based flux and performed around 600° C.

In addition, a tube or a header plate composing a heat exchanger is constituted by a brazing sheet.

As the brazing sheet, for example, a brazing sheet in which a brazing material made of Al—Si-based alloy is bonded to one surface of a core material made of aluminum alloy containing Mn, Cu, Si and Fe in the predetermined amounts and a sacrificial material (liner material) made of aluminum alloy with electrochemically lower potential than that of the core material is bonded to the other surface of the core material, is known (for example, refer to Patent Documents 1 and 2).

As the sacrificial material used here, a material having electrochemically lower potential than that of the core material is used, and thereby the material functions as a sacrificial anode material and corrosion of the core material can be prevented.

CITATION LIST

Patent Document

[Patent Document 1] Japanese Unexamined Patent Application, First Publication No. H9-295089
[Patent Document 2] Japanese Unexamined Patent Application, First Publication No. 2012-117107

SUMMARY OF INVENTION

Technical Problem

In the above-mentioned brazing sheet, for example, for reduction of the size and improvement of the performance of the heat exchanger, further reduction of thickness of the materials is required.

When the material with the reduced thickness is subjected to brazing heat treatment similar to the conventional process, diffusion of Zn added to the sacrificial material into the interior of the core material and diffusion of Cu added to the core material into the sacrificial material and the brazing material are promoted.

Therefore, there is a problem that the pitting potential difference of the inner surface and the outer surface of the tube from the core material decreases, the corrosion resistance is deteriorated, and a through hole is generated in the materials at the early stage.

The present invention was made in light of the above-described circumstance, and is intended to provide a brazing sheet which has a high strength and an improved corrosion resistance even in a case of being used for a heat exchanger having a brazing structure with thin walls.

Solution to Problem

In order to solve the problem, the present invention relates to an aluminum alloy brazing sheet with a thickness of 0.30 mm or less, including: a core material; a sacrificial material cladding one surface of the core material; and a brazing material cladding the other surface of the core material, in which the core material is made of Al—Mn—Si-based aluminum alloy containing, by mass %, Cu: 0.5 to 1.3%, the sacrificial material is made of aluminum alloy containing: by mass %, Zn: 4.0 to 7.0%; and the balance being Al and inevitable impurities, the brazing material is made of aluminum alloy containing: by mass %, Si: 6.0 to 11.0%; Zn: 0.1 to 3.0%; and the balance being Al and inevitable impurities, and in a pitting potential after brazing heat treatment which is measured along a thickness direction of the brazing sheet, a thickness of a region in which a potential difference from the noblest potential in the core material is 100 mV or more is 5% to 50% of the thickness of the brazing sheet.

In the present invention, the core material may further contain one or more selected from the group consisting of: by mass %, Mn: 0.5 to 1.8%; Si: 0.05 to 1.3%, Fe: 0.05 to 0.5%; Mg: 0.05 to 0.5%; Zr: 0.05 to 0.3%; Ti: 0.05 to 0.3%; and Cr: 0.05 to 0.3%.

In the present invention, the sacrificial material may be made of the aluminum alloy further containing one or more selected from the group consisting of: by mass %, Mn: 1.0 to 1.8%; and Si: 0.2 to 1.2%.

In the present invention, it is preferable that, in the pitting potential after the brazing heat treatment, within a region in which a potential difference from the noblest potential in the core material is 100 mV or more, $1<(A+1)/(B+1)<81$ is satisfied where A μm is a length of the region from a surface of the sacrificial material in the thickness direction and B μm is a length of the region from a surface of the brazing material in the thickness direction of the core material.

In the present invention, a pitting potential difference after the brazing heat treatment between the core material and the sacrificial material is preferably 160 to 290 mV.

In the present invention, after the brazing heat treatment, the thickness of a region in which Zn concentration is 0.2% or less is preferably 20% to 70% of the thickness of the brazing sheet.

Advantageous Effects of Invention

In the present invention, the high-corrosion resistant material is used as the aluminum alloy with chemical components which can correspond to a brazing sheet with a reduced thickness, element diffusion state of Zn added to the sacrificial material and Cu added to the core material can be controlled when the sheet is subjected to the brazing heat treatment suitable for a sheet with a reduced thickness, the pitting potential differences between the sacrificial material and the core material and between the brazing material and the core material are made adequate, and the potential balance between the sacrificial material side and the brazing material side is set to the optimal relationship. Thereby, it is possible to provide a brazing sheet with an improved corrosion resistance even when the brazing sheet has the reduced thickness compared to a conventional sheet.

DESCRIPTION OF EMBODIMENTS

Figure 1:
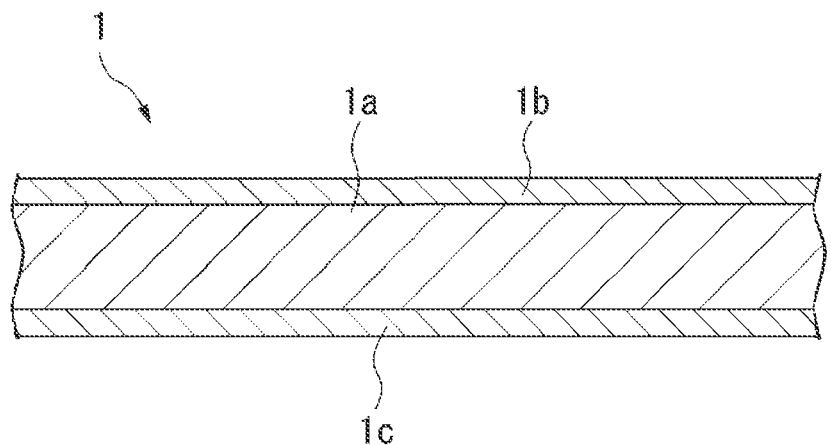
FIG. 1 is a cross-sectional view of a brazing sheet according to an embodiment of the present invention which is employed for a heat exchanger.

Hereinafter, the first embodiment of a brazing sheet according to the present invention will be described with reference to the drawings.

In some cases, in the drawings used in the following description, characteristic portions are shown on an enlarged scale for convenience of emphasizing the characteristic part and the dimension ratios and the like of the respective components are not necessarily the same as the actual ones. In addition, for the same purpose, in sonic cases, non-characteristic portions are omitted.

FIG. 1 is a cross-sectional view of the brazing sheet 1 of the present embodiment. This brazing sheet 1 mainly includes: a core material 1a made of aluminum alloy: a layered brazing material 1b made of aluminum alloy and bonded (clad pressure-bonded) to one surface of the core material 1a: and a layered sacrificial material 1c made of aluminum alloy and bonded (clad pressure-bonded) to the other surface of the core material 1a. The brazing sheet 1 shown in FIG. 1 is formed, for example, in B-Shape to form the B-shaped tube 10 shown in FIG. 2, and then, for example, this tube 10 is assembled as shown in FIG. 3 to construct a heat exchanger 20.

Figure 2:
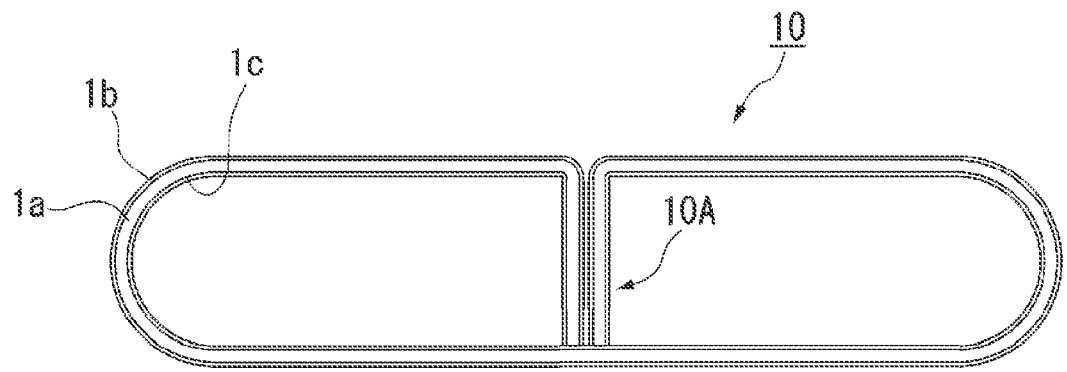
FIG. 2 is a cross-sectional view showing an example of a tube formed by using the brazing sheet shown in FIG. 1.
Figure 3:
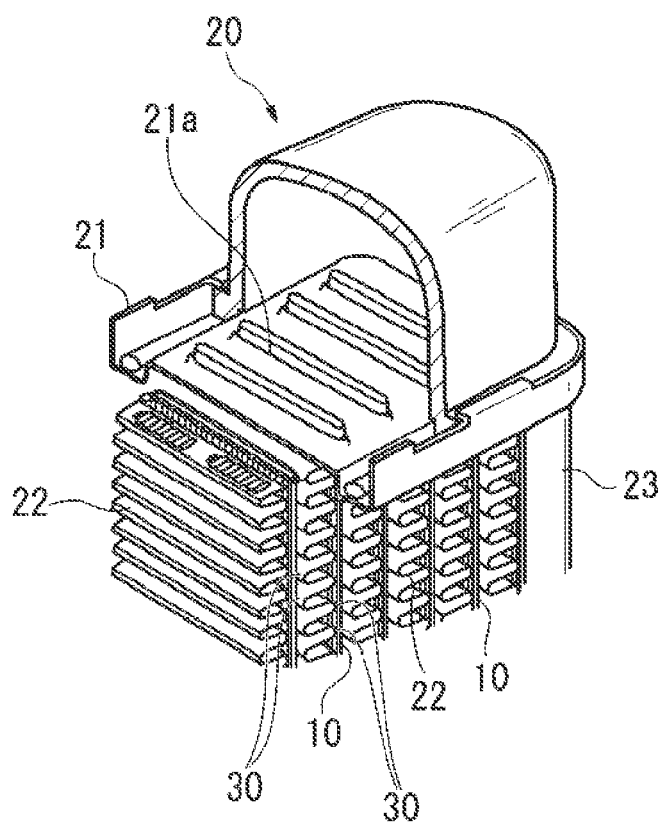
FIG. 3 is a perspective view of a heat exchanger using the brazing sheet, in which a part of the heat exchanger is shown as a cross-section thereof.

For example, as shown FIG. 2, the tube 10 can be formed in the B-shaped tube 10 by forming the above-mentioned brazing sheet 1 in a flat-tube shape using a forming roll or the like in such a manner that the sacrificial material 1c is located inside of the tube and the brazing material 1b is located outside of the tube while the end edges of the brazing sheet is served as a butting portion.

The heat exchanger 20 has a structure, for example, used for a radiator or the like of an automobile, and basically includes: the tube 10: a header 21, an outer fin 22, and a side support 23.

The tubes 10 are joined with the header 21 by inserting the end portion of each of the tubes 10 into each of the slots (insert holes) 21a which are formed in array on header 21, and brazing them using the brazing material 1b disposed around the inserted portions. Further, the tubes 10 and the outer fin 22 are joined by brazing them with each other using the brazing material 1b provided on the brazing sheet 1 which constitutes the tube 10.

Here, the brazing of the end portions 10A, 10A of each of the brazing sheet 1 when forming the tube 10 (refer to FIG. 2), the brazing of the header 21 and the tubes 10, and the brazing of the tube 10 and the outer fin 22 can be performed simultaneously when assembling the heat exchanger 20.

Next, the compositions of the core material 1a, the brazing material 1b, and the sacrificial material 1c which constitute the brazing sheet 1 of the present embodiment will be explained.

In the brazing sheet 1, the core material 1a is made of Al—Mn—Si-based aluminum alloy containing, by mass %, Cu: 0.5 to 1.3%, the sacrificial material 1c is made of aluminum alloy including: by mass %, Zn: 4.0 to 7.0%; and the balance being Al and inevitable impurities, and the brazing material 1b is made of aluminum alloy including: by mass %, Si: 0.6 to 11.0%; Zn: 0.1 to 3.0%; and the balance being Al and inevitable impurities.

In this description, when the upper limit and the lower limit of the composition ratio is described as 0.5 to 1.3%, it encompasses the upper limit and the lower limit, unless otherwise stated. That is, 0.5 to 1.3% means the range of 0.5% or more and 1.3% or less.

The aluminum alloy constituting the core material 1a may have a composition which further contains one or more selected from the group consisting of: by mass %, Mn: 0.5 to 1.8%; Si: 0.05 to 1.3%; Fe: 0.05 to 0.5%; Mg: 0.05 to 0.5%; Zr: 0.05 to 0.3%; Ti: 0.05 to 0.3%; and Cr: 0.05 to 0.3% in addition to the above-mentioned composition.

The aluminum alloy constituting the sacrificial material 1c may have a composition further contains one or more selected from the group consisting of Mn: 1.0 to 1.8% and Si: 0.2 to 1.2% in addition to the above-mentioned composition.

Hereafter, each component will be explained.

<Core Material Components>

[Cu: 0.5 to 1.3 mass %]

Cu has an action of forming solid-solution with the matrix and thereby imparting high strength to the aluminum alloy. However, when Cu content is less than 0.5 mass %, the strength is insufficient. When Cu content exceeds 1.3 mass %, the corrosion resistance is deteriorated. Therefore, Cu content is desirably 0.5 to 1.3 mass % and more preferably 0.8 to 1.2 mass %

[Mn: 0.5 to 1.8 mass %]

Mn has an effect of forming Al—Mn—Si-based, Al—Mn—Fe-based, and Al—Mn—Fe—Si-based intermetallic compounds finely in the matrix and thereby improving the strength of the material. However, when Mn content is less than 0.5 mass %, this effect is not exhibited sufficiently. When Mn content exceeds 1.8 mass %, coarse intermetallic compounds are generated during cast and thus the formability of the material is deteriorated. For the similar reasons, Mn content is more desirably 1.0 to 1.75 mass %.

[Si: 0.05 to 1.3 mass %]

Si has an effect of forming Al—Mn—Si-based and Al—Mn—Fe—Si-based intermetallic compounds finely in the matrix and thereby improving the strength of the material. However, when Si content is less than 0.05 mass %, this effect is not exhibited sufficiently. When Si content exceeds 1.3 mass %, the melting point of the material is lowered. For the similar reasons, Si content is more desirably 0.5 to 1.1 mass %.

[Fe: 0.05 to 0.5 mass %]

Fe has an effect of forming Al—Mn—Fe-based and Al—Mn—Fe—Si-based intermetallic compounds finely in the matrix and thereby improving, the strength of the material. However, when Fe content is less than 0.05 mass %, the castability is deteriorated. When Fe content exceeds 0.5 mass % coarse intermetallic compounds are generated during cast and thus the formability of the material is deteriorated. For the similar reasons, Fe content is more desirably 0.2 to 0.4 mass %.

[Mg: 0.05 to 0.5 mass %]

Mg has an effect of improving the strength of the material. However, when Mg content is less than 0.05 mass %, this effect is not exhibited sufficiently. When Mg content exceeds 0.5 mass %, the brazability is deteriorated. For the similar reasons, Mg content is more desirably 0.1 to 0.4 mass %.

[Zr: 0.05 to 0.3 mass %, Ti: 0.05 to 0.3 mass %, and Cr: 0.05 to 0.3 mass %]

Zr, Ti and Cr contribute to imparting high strength to aluminum alloy.

However, addition of each of them in less than 0.05 mass % is not sufficient for improvement of strength. When each of them is added in more than 0.3 mass %, the formability is deteriorated.

<Brazing Material Components>

The brazing material 1b constituting the tube 10 is made of aluminum alloy including: 6.0 to 11.0 mass % of Si: 0.1 to 3.0 mass % of Zn; and the balance being aluminum and the inevitable impurities.

[Si: 6.0 to 11.0 mass %]

Si contained in the brazing material 1b is an element lowering the melting, point and imparting flowability. When Si content is less than 6 mass %, the desired effect is insufficient and when Si content exceeds 11 mass %, the flowability is rather deteriorated, which are not preferable. Therefore, Si content in the brazing material 1b is preferably 6.0 to 11.0 mass %.

[Zn: 0.1 to 3.0 mass %]

Zn has an action of lowering the electrical potential of aluminum alloy and an effect of, when being added to the brazing material 1b, increasing the potential difference from the core material 1a, forming a potential gradient effective for the corrosion resistance to improve the corrosion resistance, and thereby reducing the corrosion depth. However, when Zn content is less than 0.1 mass %, the effect is not exhibit sufficiently. When Zn content exceeds 3.0 mass %, the potential of the brazing material 1b becomes too low.

<Sacrificial Material Components>

The sacrificial material 1c constituting the tube 10 is preferably made of aluminum alloy with a composition including: 4.0 to 7.0 mass % of Zn; 1.0 to 1.8 mass % of Mn: 0.2 to 1.2 mass % of Si; and the balance of aluminum and the inevitable impurities.

[Zn: 4.0 to 7.0 mass %]

Zn has an action of lowering the electrical potential of aluminum alloy and an effect of, when being added to the sacrificial material 1c, increasing the potential difference from the core material 1a, forming a potential gradient effective for the corrosion resistance to improve the corrosion resistance of the brazing sheet 1 (that is, tube 10), and thereby reducing the corrosion depth.

However, when Zn content is less than 4.0 mass %, the effect is not exhibit sufficiently. When Zn content exceeds 7.0 mass %, corrosion rate is too high, the sacrificial material 1c disappears early, and thus the corrosion depth increases. For the similar reasons, Zn content is more desirably 4.5 to 6.5 mass %.

[Mn: 1.0 to 1.8 mass %]

Mn has an effect of forming Al—Mn—Si-based, Al—Mn—Fe-based, and Al—Mn—Fe—Si-based intermetallic compounds finely in the matrix and the improving the strength of the material. However, when Mn content is less than 1.0 mass %, this effect is not exhibited sufficiently. When Mn content exceeds 1.8 mass %, coarse intermetallic compounds are generated during east and thus the formability of the material is deteriorated. For the similar reasons, Mn content is more desirably 1.1 to 1.75 mass %.

[Si: 0.2 to 1.2 mass %]

Si has an effect of forming fine Mg—Si compounds with Mg and thereby improving the strength of the material. However, when Si content is less than 0.2 mass % or less, the effect is not exhibited sufficiently. When Si content exceeds 1.2 mass %, the melting point of the material is lowered. For the similar reasons, Si content is more desirably 0.4 to 1.0 mass %.

<Permutation of Electrical Potential>

In the brazing sheet 1 of the present embodiment, in the pitting potential after the brazing heat treatment, a thickness of a region in which a potential difference from the noblest potential in the core material 1a is 100 mV or more is 10% to 50% of the thickness of the brazing sheet 1.

Furthermore, in the pitting potential after the brazing heat treatment, within the region in which a potential difference from the noblest potential in the core material 1a is 100 mV or more, relationship of $1<(A°1)/(B+1)<81$ is satisfied where A μM is a length (thickness) of this region from the outermost surface of the sacrificial material 1c in the thickness direction of the core material 1a and B μm is a length (thickness) of this region from the outermost surface of the brazing material 1b in the thickness direction.

Figure 4:
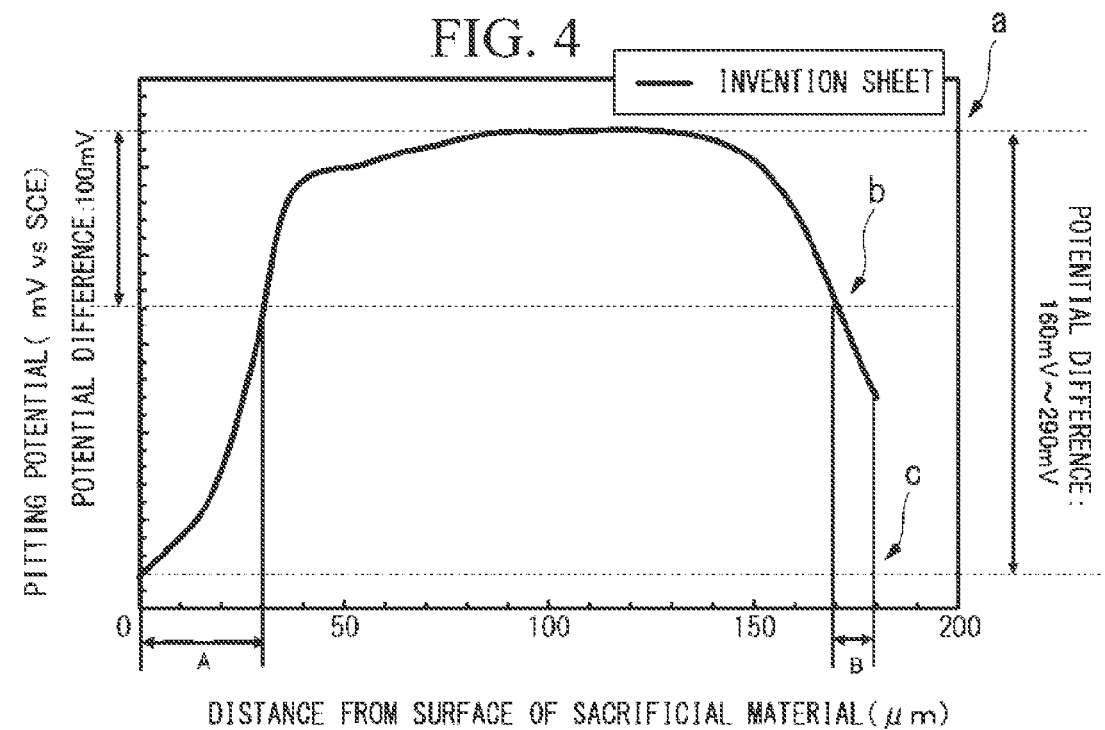
FIG. 4 is a graph showing a relationship between a distance from a surface of a sacrificial material and a pitting potent al in a sample obtained in an invention example.

FIG. 4 shows the outline of these relationship. FIG. 4 shows a case where a horizontal axis represents the distance from the outermost surface of the sacrificial material in the brazing sheet 1 and the vertical axis represents the pitting potential. That is, FIG. 4 shows the pitting potential at every position along the cross-section of the brazing sheet 1 in the thickness direction in whole of the brazing sheet 1 including the core material 1a, the brazing material 1b, and the sacrificial material 1c.

The position of the noblest potential in the core material 1a corresponds to the peak of the curve representing the pitting potential, and is represented as a dotted line a in FIG. 4. The position at which the potential difference from the noblest potential in the core material 1a is 100 mV is represented as a dotted line b. Within the region in which the potential difference from the noblest potential in the core material 1a is 100 mV or more, a length (thickness) of the region from the outermost surface of the sacrificial material 1c toward the core material 1a in the thickness direction is represented as A in FIG. 4. Within the region in which the potential difference from the noblest potential in the core material 1a is 100 mV or more, a length (thickness) of the region from the outermost surface of the brazing material 1b toward the thickness direction is represented as B in FIG. 4. In FIG. 4, the position of the left end of the horizontal axis represents the position of the outer surface of the sacrificial material 1c, and the position of the right end of the curved line represents the position of the outer surface of the brazing material 1b.

In addition, a range where the pitting potential difference after the brazing heat treatment between the core material 1a and the sacrificial material 1b is 160 to 290 mV is represented as a range between the dotted lines a and c in FIG. 1.

Such potential gradient of the pitting potential is resulted from that during brazing, the elements contained in the sacrificial material 1c is diffused, in particular. Zn is diffused and thereby the potential gradient depending on the Zn concentration is generated in the core material 1a.

Here, the potential gradient shown in FIG. 4 is due to the adjustment of brazing conditions and the like in addition to the employment of the aluminum alloy composition for the core material and the aluminum alloy composition for the sacrificial material described above in the present embodiment.

The brazing sheet 1 has the potential balance of the pitting potential as described above, and thereby it is possible to improve the corrosion resistance of the brazing sheet 1 and prevent generation of a through hole.

<Production of Brazing Sheet>

For producing the brazing sheet 1 with the above-described constitution, for example, an ingot of aluminum alloy for the core material, an ingot of aluminum alloy for the sacrificial material, and an ingot of aluminum alloy for the brazing material which have the composition within the present invention and are obtained by melting and casting, are prepared.

These ingots of aluminum alloy can be subjected to homogenization treatment in which the ingots are heated, for example, at 530 to 600° C. for 8 to 16 hours. The ingots are hot-rolled to be in alloy plates. Further, the ingots may be formed in alloy plates through continuous casting rolling.

Typically, these aluminum alloy plates are assembled as a clad and subjected to cladding at a proper clad ratio. The cladding is preformed generally using a rolling. Thereafter, by further performing a cold rolling, the aluminum alloy brazing sheet with the desirable thickness can be obtained. In the clad material, for example, the sacrificial material:the core material:the brazing material can be set to 15%:75%:10%. However, the constitution of the clad material is not limited thereto, and, for example, the clad ratio of the sacrificial material may be 17% or 20%.

In the above-mentioned production process, process annealing can be performed between an interval of the cold rolling. The process annealing can be performed, for example, by heating at 200 to 400° C. for about 1 to 6 hours. At the final rolling after the process annealing the cold rolling is performed at 10 to 50% of reduction ratio. The prepared clad material is subjected to the heat treatment corresponding to brazing in a high-purity nitrogen gas atmosphere and in drop form. The heat treatment corresponding to brazing can be performed, for example, by heating the material at a heating rate such that arrival time from room temperature to target temperature is set to 1 to 20 minutes and holding the material at the target temperature of 590° C.' to 610° C. for 1 to 8 minutes.

In the brazing sheet 1 with the above-described constitution, the core material 1a contains Mn and Si and contains Cu at a particular range to be high-strength material of which the thickness can be reduced, while the sacrificial material 1c contains Zn, Mn and Si at particular ranges to be high-strength material of which the thickness can be reduced. Additionally, in the relationship between the core material and the sacrificial material, the pitting potential balance of the core material is set to the particular relationship. Thereby, it is possible to provide the brazing sheet having an improved corrosion resistance even when the thickness is reduced.

Thus, by constituting a heat exchanger using the above-described brazing sheet, a heat exchanger with the thin wall, light weight, and improved corrosion resistance can be provided.

In the above-described constitution, the potential balance can be set as shown in FIG. 4 due to the proper conditions of the brazing heat treatment. Specifically, the heating and cooling during the brazing heat treatment is performed in a short time compared to the conventional treatment. Thereby, heat input applied to the material is suppressed, the diffusion of the elements can be suppressed, and the prescribed potential balance as shown in FIG. 4 can be realized.

EXAMPLE

Hereafter, the present invention is further described with reference to the following examples, but the present invention is not limited to the examples.

<Preparation of Specimens>

By semi-continuous casting, aluminum alloy for the core material, aluminum alloy for the sacrificial material, and aluminum alloy for the brazing material were casted. Here, the compositions and the specimen numbers of the aluminum alloys for the core material are shown in Table 1, the compositions and the specimen numbers of the aluminum alloys for the sacrificial material are shown in Table 2, and the compositions of the aluminum alloys for the brazing material are shown in Table 3.

TABLE 1

| | | Core material | | | | | | | |
|---|---|---|---|---|---|---|---|---|---|
| | | Alloy composition (mass %) | | | | | | | |
| | No. | Cu | Mn | Si | Fe | Mg | Zr | Ti | Cr | Remarks |
| Invention example | A1 | 0.9 | 0.5 | 0.6 | 0.4 | — | — | — | — | Mn: lower limit |
| | A2 | 1.1 | 1.8 | 0.7 | 0.4 | — | — | — | — | Mn: upper limit |
| | A3 | 1.0 | 1.4 | 0.1 | 0.3 | — | — | — | — | Si: lower limit |
| | A4 | 1.1 | 1.7 | 1.2 | 0.2 | — | — | — | — | Si: upper limit |
| | A5 | 0.8 | 1.6 | 0.8 | 0.1 | — | — | — | — | Fe: lower limit |
| | A6 | 0.9 | 1.5 | 0.7 | 0.5 | — | — | — | — | Fe: upper limit |
| | A7 | 0.7 | 1.5 | 0.8 | 0.3 | 0.1 | — | — | — | Mg: lower limit |
| | A8 | 1.1 | 1.7 | 0.9 | 0.4 | 0.5 | — | — | — | Mg: upper limit |
| | A9 | 1.0 | 1.6 | 0.6 | 0.5 | — | 0.05 | 0.05 | 0.05 | Zr, Ti and Cr: lower limit |
| | A10 | 0.8 | 1.5 | 0.7 | 0.5 | — | 0.3 | 0.3 | 0.3 | Zr, Ti and Cr: upper limit |
| | A11 | 0.6 | 1.4 | 0.7 | 0.2 | — | — | — | — | Cu: lower limit |
| | A12 | 1.2 | 1.5 | 0.9 | 0.3 | — | — | — | — | Cu: upper limit |
| | A13 | 1.0 | 1.6 | 0.8 | 0.3 | — | — | — | — | Medium value |

TABLE 1-continued

Core material

| | No. | Alloy composition (mass %) | | | | | | | Remarks |
| --- | --- | --- | --- | --- | --- | --- | --- | --- | --- |
| | | Cu | Mn | Si | Fe | Mg | Zr | Ti | Cr | |
| Comparative example | A14 | 1.0 | 0.3 | 0.8 | 0.3 | — | — | — | — | Mn: less than lower limit |
| | A15 | 1.1 | 2.0 | 0.7 | 0.4 | — | — | — | — | Mn: more than upper limit |
| | A16 | 1.0 | 1.4 | 1.4 | 0.4 | — | — | — | — | Si: more than upper limit |
| | A17 | 0.9 | 1.5 | 0.9 | 0.7 | — | — | — | — | Fe: more than upper limit |
| | A18 | 0.9 | 1.7 | 0.9 | 0.6 | 0.6 | — | — | — | Mg: more than upper limit |
| | A19 | 1.0 | 1.7 | 0.7 | 0.3 | — | 0.4 | 0.4 | 0.4 | Zr, Ti and Cr: more than upper limit |
| | A20 | 0.3 | 1.6 | 0.6 | 0.5 | — | — | — | — | Cu: less than lower limit |
| | A21 | 1.5 | 1.5 | 0.8 | 0.5 | — | — | — | — | Cu: more than upper limit |

TABLE 2

Sacrificial material

| | No. | Alloy composition (mass %) | | | Remarks |
| --- | --- | --- | --- | --- | --- |
| | | Mn | Si | Zn | |
| Invention example | B1 | 1.0 | 0.5 | 4.9 | Mn: lower limit |
| | B2 | 1.8 | 0.5 | 5.2 | Mn: upper limit |
| | B3 | 1.3 | 0.2 | 5.9 | Si: lower limit |
| | B4 | 1.4 | 1.1 | 4.8 | Si: upper limit |
| | B5 | 1.2 | 0.4 | 4.3 | Zn: lower limit |
| | B6 | 1.4 | 0.7 | 6.8 | Zn: upper limit |
| | B7 | 1.5 | 0.6 | 5.5 | Medium value |
| Comparative example | B8 | 0.9 | 0.7 | 5.2 | Mn: less than lower limit |
| | B9 | 2.0 | 0.6 | 6.4 | Mn: more than upper limit |
| | B10 | 1.5 | 0.1 | 5.3 | Si: less than lower limit |
| | B11 | 1.3 | 1.4 | 5.5 | Si: more than upper limit |
| | B12 | 1.6 | 0.7 | 3.2 | Zn: less than lower limit |
| | B13 | 1.7 | 0.5 | 8.1 | Zn: more than upper limit |

TABLE 3

Brazing material

| No. | Alloy composition (mass %) | | Remarks |
| --- | --- | --- | --- |
| | Si | Zn | |
| C1 | 6.2 | 1.5 | Si: lower limit |
| C2 | 10.8 | 1.9 | Si: upper limit |
| C3 | 8.5 | 0.1 | Zn: lower limit |
| C4 | 7.9 | 2.9 | Zn: upper limit |
| C5 | 9.8 | 1.0 | Medium value |
| C6 | 5.3 | 2.2 | Si: less than lower limit |
| C7 | 11.9 | 1.4 | Si: more than upper limit |
| C8 | 8.8 | 0.04 | Zn: less than lower limit |
| C9 | 10.5 | 3.9 | Zn: more than upper limit |

The obtained core materials were subjected to homogenization treatment at 580° C. for 8 hours. This condition of the homogenization treatment is an example, and the conditions can be selected from the ranges of temperature: 530 to 600° C. and holding time: 8 to 16 hours. Further, the sacrificial materials and the brazing materials were not subjected to homogenization treatment.

Next, the sacrificial material was combined with one surface of the core material and the brazing material was combined with the other surface of the core material, and they were hot-rolled to prepare the clad material and further cold-rolled. Thereafter, process annealing was performed at 330° C. for 4 hours and then final cold-rolling was performed at a predetermined reduction ratio to prepare H14 grade clad materials (specimens) with a thickness of 0.20 mm. In the clad materials, the sacrificial material:the core material:the brazing, material (thickness) was set to 15%: 75%:10%. In these clad materials, before heat treatment corresponding to brazing, the thickness of the core material was 150 μm, the thickness of the brazing material was 20 μm, and the thickness of the sacrificial material was 30 μm. Here, the conditions of the process annealing can be selected from the ranges of temperature: 200 to 380° C. and holding time: 1 to 6 hours.

The clad materials were subjected to the heat treatment corresponding to brazing, in which the materials were heated at a heating rate such that the arrival time from room temperature to 400° C. was 7 to 9 minutes, the arrival time tom 100° C. to 550° C. was 1 to 2 minutes, the arrival time from 550° C. to target temperature was 3 to 6 minutes, held at the target temperature of 600° C. for 3 minutes, cooled to 300° C. at 60° C./min, and then air-cooled to room temperature. At this time, in the case where the brazing time was represented as t, diffusion coefficient of Zn was represented as D, the amount of heat input expressed as $\sqrt{(\Sigma Dt)}$ was 25 to 35. By this heat treatment, heat corresponding to that during brazing was applied to and melted the brazing material, while the elements diffused from the sacrificial material and the elements mainly including Zn diffused toward the core material.

Through the above-described processes, brazing sheets as the samples Nos. 1 to 32 were prepared. In the following Table 4, the core material type, the sacrificial material type, and the brazing material type of the brazing sheet of the samples Nos. 1 to 32 are shown. Here, the balance in the elements shown in Tables 1 to 3 is Al and inevitable impurities. Further, regarding the respective specimens, evaluation results of the inner corrosion resistance, the outer corrosion resistance, and the formability are shown in Table 4.

TABLE 4

| | No. | Core material | Sacrificial material | Brazing material | Region where potential difference from core material was 100 mV or more*1 (μm) | A + 1/B + 1*2 | Pitting potential difference between core material and sacrificial material*3 (mV) | Region where Zn concentration was 0.2% or less*4 (μm) | Inner corrosion resistance | Outer corrosion resistance | Formability |
|---|---|---|---|---|---|---|---|---|---|---|---|
| Invention example | 1 | A1 | B1 | C5 | 42 | 29 | 260 | 75 | A | A | A |
| | 2 | A2 | B2 | C5 | 33 | 25 | 234 | 81 | A | A | C |
| | 3 | A3 | B3 | C5 | 32 | 30 | 220 | 68 | A | A | A |
| | 4 | A4 | B4 | C5 | 40 | 39 | 230 | 80 | A | A | B |
| | 5 | A5 | B5 | C1 | 25 | 6 | 187 | 69 | B | B | A |
| | 6 | A6 | B6 | C2 | 21 | 27 | 266 | 92 | B | C | A |
| | 7 | A7 | B5 | C5 | 30 | 45 | 185 | 44 | C | A | A |
| | 8 | A8 | B6 | C5 | 55 | 39 | 274 | 109 | C | A | B |
| | 9 | A9 | B7 | C3 | 35 | 27 | 233 | 70 | A | B | A |
| | 10 | A10 | B7 | C4 | 61 | 7 | 244 | 81 | A | B | A |
| | 11 | A11 | B7 | C5 | 55 | 10 | 236 | 76 | A | A | A |
| | 12 | A12 | B7 | C5 | 29 | 21 | 267 | 71 | B | A | A |
| | 13 | A13 | B7 | C5 | 36 | 27 | 231 | 88 | A | A | A |
| | 14 | A13 | B7 | C5 | 8 | 7 | 203 | 45 | C | B | A |
| | 15 | A13 | B7 | C5 | 31 | 0.7 | 187 | 39 | C | B | B |
| | 16 | A13 | B7 | C5 | 17 | 20 | 149 | 38 | B | B | A |
| | 17 | A13 | B7 | C5 | 22 | 17 | 198 | 21 | B | A | A |
| | 18 | A13 | B7 | C5 | 26 | 0.8 | 144 | 29 | C | C | B |
| | 19 | A13 | B7 | C5 | 30 | 18 | 132 | 24 | C | B | B |
| Comparative example | 20 | A14 | B8 | C9 | 41 | 30 | 269 | 77 | A | D | C |
| | 21 | A15 | B9 | C8 | 42 | 27 | 274 | 74 | B | B | D |
| | 22 | A16 | B10 | C7 | Evaluation was impossible due to melting of core material after heat treatment corresponding to brazing. | | | | | | |
| | 23 | A17 | B11 | C6 | Evaluation was impossible due to melting of sacrificial material after heat treatment corresponding to brazing. | | | | | | |
| | 24 | A18 | B8 | C6 | 47 | 39 | 255 | 62 | A | A | D |
| | 25 | A19 | B12 | C7 | 43 | 40 | 162 | 59 | D | B | B |
| | 26 | A20 | B13 | C8 | 42 | 30 | 304 | 41 | D | D | A |
| | 27 | A21 | B12 | C9 | 44 | 28 | 129 | 66 | D | D | B |
| | 28 | A15 | B9 | C8 | 7 | 14 | 186 | 48 | D | C | D |
| | 29 | A15 | B9 | C8 | 24 | 0.9 | 172 | 51 | D | C | D |
| | 30 | A15 | B9 | C8 | 37 | 29 | 145 | 58 | D | B | D |
| | 31 | A15 | B9 | C8 | 46 | 25 | 199 | 30 | D | B | D |
| | 32 | A13 | B7 | C5 | 12 | 19 | 139 | 26 | D | D | A |
| | 33 | A20 | B5 | C5 | 21 | 12 | 163 | 45 | D | B | B |
| | 34 | A11 | B12 | C5 | 24 | 19 | 168 | 39 | D | B | A |
| | 35 | A11 | B5 | C8 | 39 | 21 | 191 | 28 | B | D | A |

*1Length of region where difference from the noblest pitting potential in core material was 100 mV or more (A + B)
*2A: Length from surface of sacrificial material toward thickness direction of region where potential difference from the noblest potential in core material was 100 mV or more in pitting potential after heat treatment corresponding to brazing (μm), B: Length from surface of brazing material toward thickness direction of region where potential difference from the noblest potential in core material was 100 mV or more in pitting potential after heat treatment corresponding to brazing (μm)
*3Pitting potential difference at the outermost surface of sacrificial material from the noblest potential in core material
*4Length of region where Zn concentration was 0.2% or less in material after brazing heat treatment <Inner Corrosion Resistance>

A sample of 30×50 mm was cut out from each of the specimens after the heat treatment corresponding to brazing. The sacrificial material side of the sample was subjected to immersion test in aqueous solution containing Cr: 195 ppm, $SO_4^{2-}$: 60 ppm, $Cu^{2+}$: 1 ppm, and $Fe^{3+}$: 30 ppm for eight weeks which repeated a cycle performed at 80° C. for 8 hours and at room temperature for 16 hours. The sample after the corrosion test as immersed in boiled phosphoric acid-chromic acid mixed solution to remove the corrosion products. Then, the cross-section of the maximum corroded portion was observed, and the corrosion depth was measured as the inner corrosion resistance. The sample with the corrosion depth of 35 μm or less was evaluated as "A", the sample with the corrosion depth of more than 35 μm to 50 μm was evaluated as "B", the sample with the corrosion depth of more than 50 μm to 90 μm was evaluated as "C", and the sample with the corrosion depth of more than 90 μm was evaluated as "D."

<Outer Corrosion Resistance>

For the outer corrosion resistance, a sample of 30×100 mm was cut out from each of the specimens after the heat treatment corresponding to brazing. The brazing material side of the sample was subjected to SWAAT test prescribed in ASTM 685-A3 for 500 hours. The sample after the corrosion test was immersed in boiled phosphoric acid-chromic acid mixed solution to remove the corrosion products. Then, the cross-section of the maximum corroded portion was observed, and the corrosion depth was measured as the outer corrosion resistance. The sample with the corrosion depth of 35 μm or less was evaluated as "A", the sample with the corrosion depth of mere than 35 μm to 50 μm was evaluated as "B", the sample with the corrosion depth of more than 50 μm to 90 μm was evaluated as "C", and the sample with the corrosion depth of more than 90 μm was evaluated as "D."

<Formability>

Each of the specimens before the heat treatment corresponding to brazing was worked to form into B-shaped tube in such a manner that the sacrificial material was located inside of the tube. The cross-section of the worked tube was buried in resin. Using an optical microscope, the shape of the inner pillar was observed, and the gap from the target shape (size) was measured. The sample with a gap from the target size of 10 µm or less was evaluated as "A", the sample with a gap from the target size of more than 10 µm to 15 µm was evaluated as "B", the sample with a gap from the target size of more than 15 µm to 20 µm was evaluated as "C", the sample with a gap from the target size of more than 20 µm was evaluated as "D."

Hereafter, characteristics of each sample of the brazing sheet shown in Table 4 will be explained.

The samples Nos. 1 to 19 were specimens in which the potential difference balance in the thickness direction of the brazing sheet was within the target range of the present invention.

That is, in the pitting potential after brazing heat treatment, when the pitting potential was measured along the thickness direction of the brazing sheet, the thickness of the region in which the potential difference from the noblest potential in the core material was 100 mV or more was 10% to 50% of the thickness of the brazing sheet.

Additionally, the core material was made of Al—Mn—Si-based aluminum alloy containing, by mass %, Cu: 0.5 to 1.3%, the sacrificial material was made of aluminum alloy including, by mass %, Zn: 4.0 to 7.0% and the balance being Al and inevitable impurities, and the brazing material was made of aluminum alloy including, by mass %, Si: 6.0 to 11.0%; Zn: 0.1 to 3.0% and the balance being Al and inevitable impurities.

The core material further contained one or more selected from the group consisting of: by mass %, Mn: 0.5 to 1.8%; Si: 0.05 to 1.3%; Fe: 0.05 to 0.5%; Mg: 0.05 to 0.5%; Zr: 0.05 to 0.3%; Ti: 0.05 to 0.3%; and Cr: 0.05 to 0.3%.

The sacrificial material further contained one or more selected from the group consisting of: by mass %; Mn: 1.0 to 1.8% and Si: 0.2 to 1.2%.

Additionally, in the pitting potential after the heat treatment corresponding to brazing, within a region in which a potential difference from the noblest potential in the core material was 100 mV or more, the relationship of 1<(A+1)/(B+1)<81 was maintained where A µm was a length of the range from the outermost surface of the sacrificial material toward the thickness direction of the core material and B µm was a length of the range from the outermost surface of the brazing material toward the thickness direction of the core material.

Additionally, the pitting potential difference after the heat treatment corresponding to brazing between the core material and the sacrificial material was 160 to 290 mV.

Additionally, in the brazing sheet after the heat treatment corresponding to brazing, a region in which Zn concentration was 0.2% or less was 20% to 70% of the thickness of the brazing sheet.

The brazing sheet satisfying these potential balances exhibited, for example, the potential balance with a curve which was convex upward and of which both ends showed a sharp decrease of the pitting potential shown in FIG. 4.

In the sample No. 15, only the length of the region in which the potential difference from the core material was 100 mV or more was slightly shorter than the desirable range. Although the corrosion resistance vas slightly deteriorated, the outer corrosion resistance was good and the formability was very good.

In the sample No. 14, the value of A+1/B+1 was slightly smaller than the desirable range. Thus, although the inner corrosion resistance tended to be slightly deteriorated, the outer corrosion resistance and the formability were good.

In the sample No. 16, the pitting potential difference between the core material and the sacrificial material was slightly smaller than the desirable range. However, the inner corrosion resistance and the outer corrosion resistance were good and the formability was very good.

In the sample No. 17, the length of a region in which Zn concentration was 0.2©% or less was slightly shorter than the desirable range. However, the inner corrosion resistance was good and the outer corrosion resistance and the formability were very good.

In the sample No. 18, only the length of the range in which the potential difference from the core material was 100 mV or more was within the desirable range. However, the value of A+1/B+1 was slightly smaller than the desirable range, the potential difference between the core material and the sacrificial material was slightly smaller than the desirable range, and the length of the range in which Zn concentration was 0.2% or less was slightly short. Although the inner corrosion resistance and the outer corrosion resistance were slightly deteriorated, the formability was good.

In the sample No. 19, the length of the region in which the potential difference from the core material was 100 mV or more and the value of A+1/B+1 were within the desirable ranges. However, the pitting potential difference between the core material and the sacrificial material was slightly smaller than the desirable range, and the length of the region in which Zn concentration was 0.2% or less was slightly shorter than the preferable range. Although the outer corrosion resistance and the formability were good, the inner corrosion resistance tended to be slightly deteriorated.

In contrast to these samples, in the specimens of No. 20, Mn content of the core material was much lower than the desirable range, Mn content of the sacrificial material as much lower than the desirable range, and Zn content of the brazing material was much higher than the desirable range, which resulted in poor outer corrosion resistance.

In the specimens of No. 21, Mn content of the core material was much higher than the desirable range. Mn content of the sacrificial material was much higher than the desirable range, and Zn content of the brazing material was much lower than the desirable range, which resulted in poor formability.

In the specimens of No. 22, Si content of the core material was much higher than the desirable range. Si content of the sacrificial material was much lower than the desirable range, and Si content of the brazing material was much higher than the desirable range. Thus, the core material melted during the heat treatment corresponding to brazing.

In the specimens of No. 23, Fe content of the core material was much higher than the desirable range, Si content of the sacrificial material was much higher than the desirable range, and Si content was much lower than the desirable range. Thus, the sacrificial material melted during the heat treatment corresponding to brazing.

In the specimens of No. 24, Mg content of the core material was much higher than the desirable range, Mn content of the sacrificial material was much lower than the desirable range, and Si content of the brazing material was much lower than the desirable range, which resulted in poor formability.

In the specimens of No. 25, Zr, Ti, and Cr contents of the core material were much higher than the desirable ranges, Zn content of the sacrificial material was much lower than the desirable range, and Si content of the brazing material was much lower than the desirable range, which resulted in poor inner corrosion resistance.

In the specimens of No. 26, Cu content of the core material was much lower than the desirable range, and Mn content of the sacrificial material was much higher than the desirable range, which resulted in that both of the inner corrosion resistance and the outer corrosion resistance were poor.

In the specimens of No. 27, Cu content of the core material was much higher than the desirable range, and Mn content of the sacrificial material was much lower than the desirable range, which resulted in that both of the inner corrosion resistance and the outer corrosion resistance were poor.

In the specimens of No. 28, the thickness of the region in which the potential difference from the noblest potential in the core material was 100 mV or more was too thin and out of the range of 10% to 50% of the thickness of the core material, and Mn contents were too large, which resulted in that the inner corrosion resistance and the formability were poor.

In the sample No. 29, the value of A+1/B+1 was slightly smaller than the desirable range, and Mn contents were too large, which resulted in that the inner corrosion resistance and the formability were poor.

In the specimens of No. 30, the pitting potential difference after the brazing heat treatment between the core material and the sacrificial material was too small and not within the range of 160 to 290 mV, and Mn contents were too large, which resulted in that the inner corrosion resistance and the formability were poor.

Figure 6:
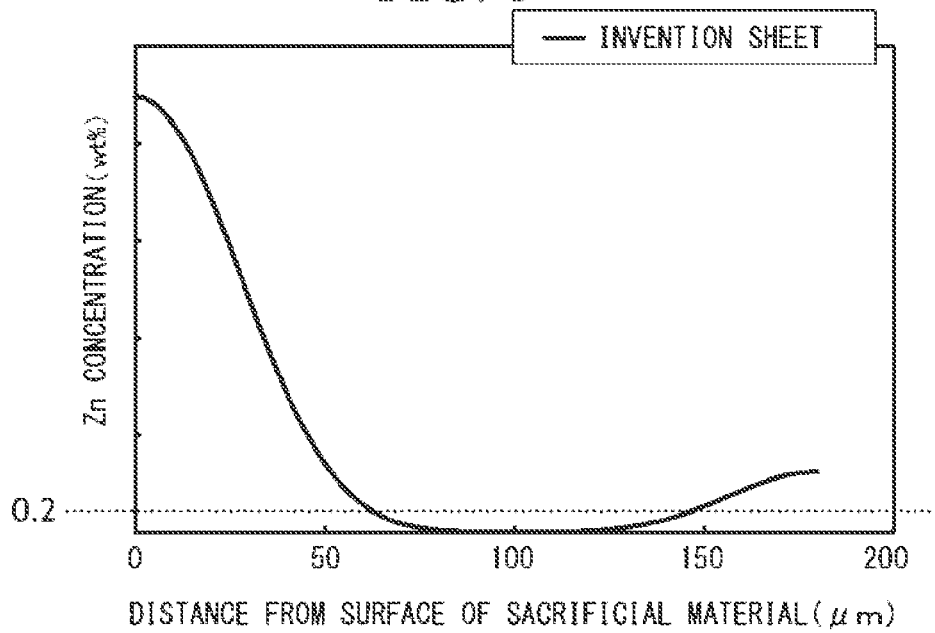
FIG. 6 is a graph showing a relationship between a distance from the surface of the sacrificial material and a Zn concentration in the sample obtained in the invention example.
Figure 7:
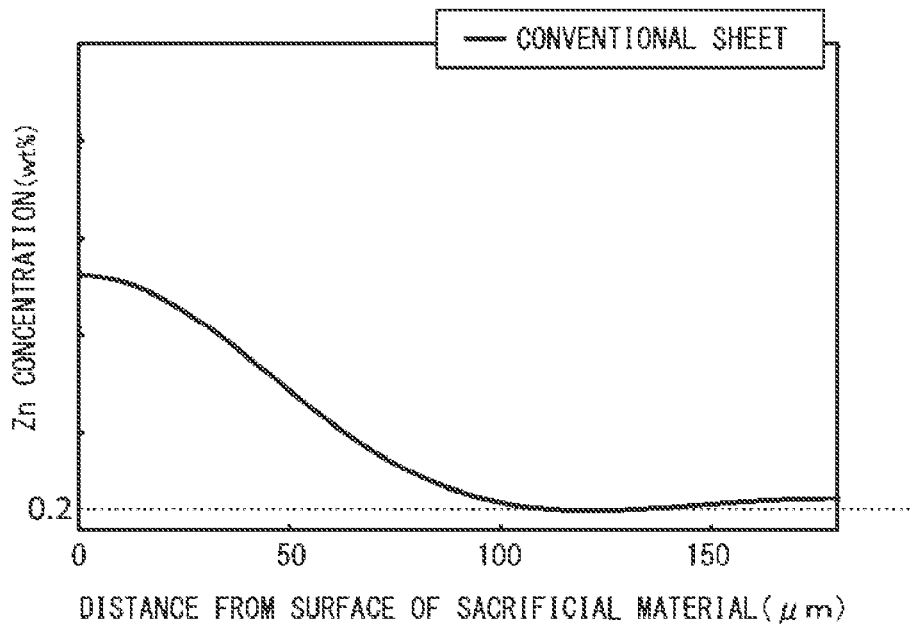
FIG. 7 is a graph showing a relationship between a distance from the surface of the sacrificial material and a Zn concentration in the sample obtained in the conventional example.

In the specimens of No. 31, the thickness of the region in which Zn concentration was 0.2% or less was small, which resulted in that both of the inner corrosion resistance and the outer corrosion resistance were poor. FIG. 7 shows an example of the region in which Zn concentration is 0.2% or less as in these specimens. As shown in FIG. 6, the thickness of the region in which Zn concentration is 0.2% or less is preferably 20 to 70% of the thickness of the core material.

Figure 5:
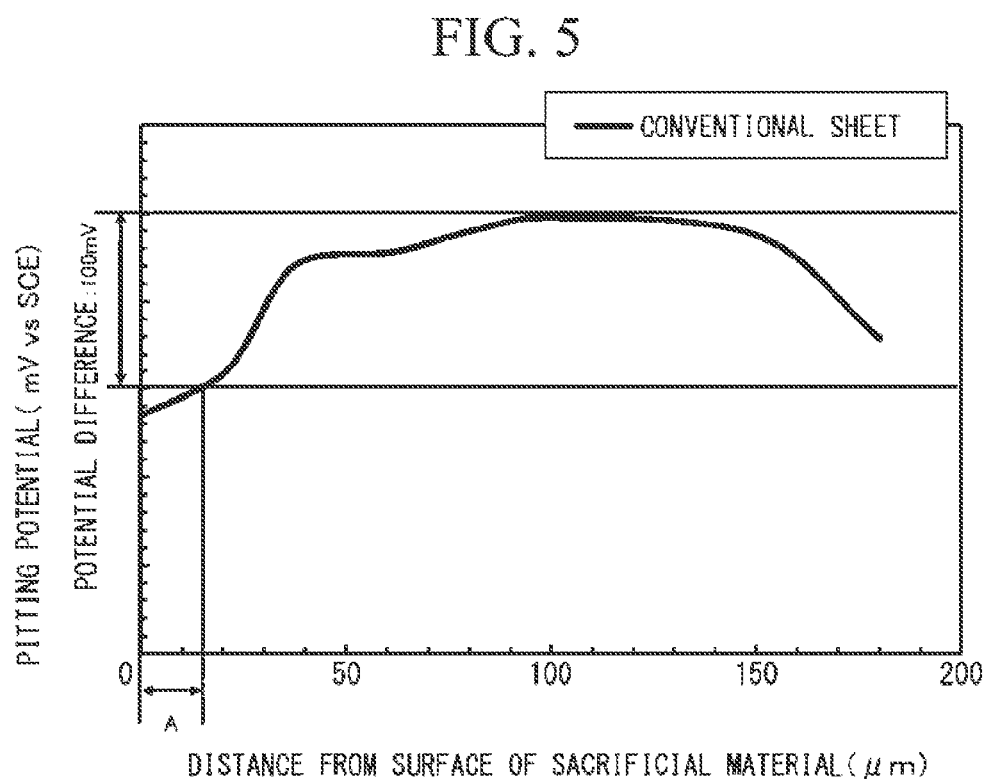
FIG. 5 is a graph showing a relationship between a distance from a surface of a sacrificial material and a pitting potential in a sample obtained in a conventional example.

The specimen of No. 32 was a conventional brazing sheet. The thickness of the region in which the potential difference from the noblest potential in the core material was 100 mV or more was insufficient, the pitting potential difference between the core material and the sacrificial material was too small and not within 160 to 290 mV, and the thickness of the region in which Zn concentration was 0.2% or less was small, which resulted in that both of the inner corrosion resistance and the outer corrosion resistance were poor. The distribution of the pitting potential of this specimen is shown in FIG. 5, which is clearly different from the distribution of the pitting potential of the specimen according to the present invention shown in FIG. 4.

The specimens of No. 33 had a small Cu content of the core material, and the specimens of No. 34 had a small Zn content of the sacrificial material. In the both specimens, the inner corrosion resistance was poor. The specimens of No. 35 had a small Zn content of the brazing material, which resulted in poor outer corrosion resistance.

REFERENCE SIGNS LIST

1: BRAZING SHEET
1a: CORE MATERIAL
1b: BRAZING MATERIAL
1c: SACRIFICIAL MATERIAL
10: TUBE
20: HEAT EXCHANGER
21: HEADER
22: OUTER FIN
23: SIDE SUPPORT

The invention claimed is:

1. A method of brazing an aluminum alloy brazing sheet, the method comprising:
  attaching an aluminum alloy brazing sheet to a part that is subjected to a brazing treatment; and
  subjecting the aluminum alloy brazing sheet to a heat treatment which is conducted by heating at a heating rate in which the arrival time from room temperature to 400° C. is 7 to 9 minutes, the arrival time from 400° C. to 550° C. is 1 to 2 minutes, the arrival time from 550° C. to a target temperature is 3 to 6 minutes; holding at the target temperature of 600° C. for 3 minutes; cooling to 300° C. at 60° C./min; and then air-cooling to room temperature,
  wherein:
  the aluminum alloy brazing sheet comprises:
  a core material,
  a sacrificial material cladding one surface of the core material, and
  a brazing material cladding another surface of the core material,
  wherein,
  the core material is made of Al—Mn—Si-based aluminum alloy comprising, by mass %, Cu: 0.5 to 1.3%,
  the sacrificial material is made of aluminum alloy comprising: by mass %, Zn: 4.0 to 7.0%; and the balance being Al and inevitable impurities,
  the brazing material is made of aluminum alloy comprising: by mass %, Si: 6.0 to 11.0%; Zn: 0.1 to 3.0%; and the balance being Al and inevitable impurities; and
  the aluminum alloy brazing sheet has a thickness of 0.30 mm or less.

2. The method of brazing an aluminum brazing sheet according to claim 1, wherein
  in the pitting potential after the heat treatment, within a region in which a potential difference from the noblest potential in the core material is 100 mV or more, $1<(A+1)/(B+1)<81$ is satisfied where A (μm) is a length of the region from a surface of the sacrificial material in the thickness direction and B (μm) is a length of the region from a surface of the brazing material in the thickness direction.

3. The method of brazing an aluminum brazing sheet according to claim 1, wherein
  a pitting potential difference after the heat treatment between the core material and the sacrificial material is 160 to 290 mV.

4. The method of brazing an aluminum brazing sheet according to claim 1, wherein
  after the heat treatment, a thickness of a region in which Zn concentration is 0.2% or less is 20% to 70% of the thickness of the brazing sheet.

5. The method of brazing an aluminum brazing sheet according to claim 1, wherein the core material is made of the aluminum alloy further comprising one or more selected from the group consisting of: by mass %, Mn: 0.5 to 1.8%; Si: 0.05 to 1.3%; Fe: 0.05 to 0.5%; Mg: 0.05 to 0.5%; Zr: 0.05 to 0.3%; Ti: 0.05 to 0.3%; and Cr: 0.05 to 0.3%.

6. The method of brazing an aluminum brazing sheet according to claim 1, wherein the sacrificial material is made of the aluminum alloy further comprising one or more selected from the group consisting of: by mass %, Mn: 1.0 to 1.8%; and Si: 0.2 to 1.2%.

7. The method of brazing an aluminum brazing sheet according to claim 2, wherein a pitting potential difference after the heat treatment between the core material and the sacrificial material is 160 to 290 mV.

8. The method of brazing an aluminum brazing sheet according to claim 2, wherein
after the heat treatment, a thickness of a region in which Zn concentration is 0.2% or less is 20% to 70% of the thickness of the brazing sheet.

9. The method of brazing an aluminum brazing sheet according to claim 2, wherein the core material is made of the aluminum alloy further comprising one or more selected from the group consisting of: by mass %, Mn: 0.5 to 1.8%; Si: 0.05 to 1.3%; Fe: 0.05 to 0.5%; Mg: 0.05 to 0.5%; Zr: 0.05 to 0.3%; Ti: 0.05 to 0.3%; and Cr: 0.05 to 0.3%.

10. The method of brazing an aluminum brazing sheet according to claim 2, wherein the sacrificial material is made of the aluminum alloy further comprising one or more selected from the group consisting of: by mass %, Mn: 1.0 to 1.8%; and Si: 0.2 to 1.2%.

11. The method of brazing an aluminum brazing sheet according to claim 3, wherein
after the heat treatment, a thickness of a region in which Zn concentration is 0.2% or less is 20% to 70% of the thickness of the brazing sheet.

12. The method of brazing an aluminum brazing sheet according to claim 3, wherein the core material is made of the aluminum alloy further comprising one or more selected from the group consisting of: by mass %, Mn: 0.5 to 1.8%; Si: 0.05 to 1.3%; Fe: 0.05 to 0.5%; Mg: 0.05 to 0.5%; Zr: 0.05 to 0.3%; Ti: 0.05 to 0.3%; and Cr: 0.05 to 0.3%.

13. The method of brazing an aluminum brazing sheet according to claim 3, wherein the sacrificial material is made of the aluminum alloy further comprising one or more selected from the group consisting of: by mass %, Mn: 1.0 to 1.8%; and Si: 0.2 to 1.2%.

* * * * *